US008960536B2

(12) United States Patent
Wright

(10) Patent No.: US 8,960,536 B2
(45) Date of Patent: Feb. 24, 2015

(54) MOBILE DEVICE FOR EXITING A PARKING STRUCTURE AND METHODS THEREOF

(71) Applicant: Norman Wolverton Wright, Aurora (CA)

(72) Inventor: Norman Wolverton Wright, Aurora (CA)

( * ) Notice: Subject to any disclaimer, the term of this patent is extended or adjusted under 35 U.S.C. 154(b) by 84 days.

(21) Appl. No.: 13/760,293

(22) Filed: Feb. 6, 2013

(65) Prior Publication Data

US 2013/0214041 A1 Aug. 22, 2013

Related U.S. Application Data

(60) Provisional application No. 61/597,817, filed on Feb. 12, 2012.

(51) Int. Cl.
*G06K 15/00* (2006.01)
*G07B 15/02* (2011.01)

(52) U.S. Cl.
CPC .................................... *G07B 15/02* (2013.01)
USPC .......................................................... 235/378

(58) Field of Classification Search
CPC .......... G08G 1/46; G07B 15/00; G07B 15/02; G07B 15/04; G07C 9/025; G07F 17/24
USPC ........................................ 340/932.2; 235/378
See application file for complete search history.

(56) References Cited

U.S. PATENT DOCUMENTS

| | | | | |
|---|---|---|---|---|
| 2010/0090865 | A1* | 4/2010 | Dasgupta | 340/932.2 |
| 2010/0214128 | A1* | 8/2010 | Acharya et al. | 340/932.2 |
| 2012/0044358 | A1* | 2/2012 | Thomason et al. | 348/175 |
| 2012/0130775 | A1* | 5/2012 | Bogaard et al. | 705/13 |
| 2012/0296708 | A1* | 11/2012 | Bachmann et al. | 705/13 |
| 2013/0168442 | A1* | 7/2013 | Little et al. | 235/375 |
| 2013/0168447 | A1* | 7/2013 | Little et al. | 235/378 |
| 2014/0054367 | A1* | 2/2014 | Alexeev | 235/375 |

* cited by examiner

*Primary Examiner* — Christie I Marshall
(74) *Attorney, Agent, or Firm* — Dentons US LLP

(57) ABSTRACT

Methods and systems in the present invention facilitate vehicle exit from a parking lot, or similar venue, for which payment is required prior to being permitted egress. The Exit Express Engine permits pre-payment prior to a vehicle's arrival at a point of exit, so as to facilitate rapid confirmation of payment/authorization when exiting a controlled-exit facility. An Exit Express Engine, installed on a mobile device, is launched and used to scan a barcode printed on a parking garage ticket, which is provided to the user at the time of entry. The information scanned is then transmitted to an associated parking system, where it is received by an Exit Express Plug-in application. The user indicates payment authorization via the mobile device to an associated payment processing facility, storing payment verification. When the user arrives at the controlled exit, he/she presents the ticket, and the exit gate is activated to exit within a pre-established time.

22 Claims, 7 Drawing Sheets

MOBILE DEVICE FOR EXITING A PARKING STRUCTURE AND METHODS THEREOF

CROSS-REFERENCE TO RELATED APPLICATIONS

This application claims priority to U.S. Provisional Patent Application Ser. No. 61/597,817 entitled "Methods and Systems for Facilitating Parking Lot Exit," filed on 12 Feb. 2012, the disclosure of which is incorporated herein by reference in its entirety.

TECHNICAL FIELD

The present invention relates generally to mobile devices, and more particularly to software applications for expedient exiting a parking structure.

BACKGROUND

In recent time, there has been an explosion in the use of mobile phone applications on smartphones to facilitate a specific consumer demand. In some ways, a smartphone has rapidly become a mobile device with a powerful processing capability. The convenience of having a relatively small portable device that is light weight and easily carried by people of all ages, provides a platform in which thousands of mobile applications are created and made available for public consumption.

As the world becomes more interconnected, people are traveling more frequently locally, regionally, nationally, and globally. In entering and exiting a metered facility, such as a parking structure or other controlled-exit facilities, the processes and methods have been traditionally manually-intensive driven. In a conventional scenario, a consumer entering a parking structure at a shopping mall picks up a paper ticket before entering the parking structure. Before exiting the parking structure, the user would normally pay the necessary parking fee by walking to the service window of such parking establishment and handling the ticket to the cashier, who in turn would take the payment and manually code the ticket to reflect a verification of payment. Alternatively, there might be a receiving machine in the facility, in which the user can insert the parking ticket and pay via the machine with cash or credit card. After receiving a parking ticket that has been coded as paid, the user would normally insert the ticket at the exit gate to exit the parking structure. This method of entering and exiting a parking structure is inconvenient and inefficient.

Accordingly, it is desirable to have a smartphone or other mobile device that offers a software application, which better facilitates the use of such parking structures or controlled-exit establishments.

SUMMARY OF THE INVENTION

The present invention relates to methods and systems for facilitating vehicle exit from a parking lot, parking garage, or similar venue for which payment or other compensation, or identification, must be provided prior to being permitted egress. Alternatively, or in addition, the present invention may be applied in the context of facilitating pedestrian or vehicle exit from any venue (e.g., a building, a parking garage, a parking space, a public park, an amusement park, an airport, a stadium, or other sport facilities, or any types of facilities that require an electronic payment through a smartphone to enter or exit a controlled-exit establishments) where payment prior to such exit is required and/or an identity check must be performed prior to permitting such exit. In general, the present invention permits pre-payment and/or pre-authorization prior to a vehicle's or pedestrian's arrival at a point of exit (the exit point being controlled in some fashion) so as to facilitate rapid confirmation of such payment/authorization at the point of exit. In the description below, the example of a vehicle exiting from a parking garage is provided, however, it will be readily apparent from this description that the present invention is applicable to use in any context where proof of payment and/or identity is required prior to exiting through a controlled exit.

The Exit Express application (also referred to Exit Express Engine) permits pre-payment prior to a vehicle's arrival at a point of exit, so as to facilitate rapid confirmation of such payment/authorization when exiting a parking structure or other similar controlled-exit facility. The embodiments of the present invention operate in a Network environment, which may include one or more client computer systems (including personal computers, laptop computers, net book computers, mobile devices, and the like) that access a server via a computer network or network of networks. An Exit Express application or Exit Express Engine, installed on a smartphone or similar device, is launched and used to scan a first barcode, or other identification means printed on a parking garage ticket or other device, which is provided to the user at the time of entry. The information scanned by the smartphone is transmitted to an associated parking system, where it is received by an Exit Express Plug-in application. The user indicates payment authorization, via the smartphone to an associated payment processing facility, to a pre-established account and stores payment verification. When the user arrives at the controlled-exit point, he/she scans the ticket with a second barcode, and the exit gate is activated to allow the user's vehicle to exit within a pre-established time.

The structures and methods of the present invention are disclosed in the detailed description below. This summary does not purport to define the invention. The invention is defined by the claims. These and other embodiments, features, aspects, and advantages of the invention will become better understood with regard to the following description, appended claims, and accompanying drawings.

BRIEF DESCRIPTION OF THE DRAWINGS

The invention will be described with respect to specific embodiments thereof, and reference will be made to the drawings, in which.

DETAILED DESCRIPTION

Figure 1:
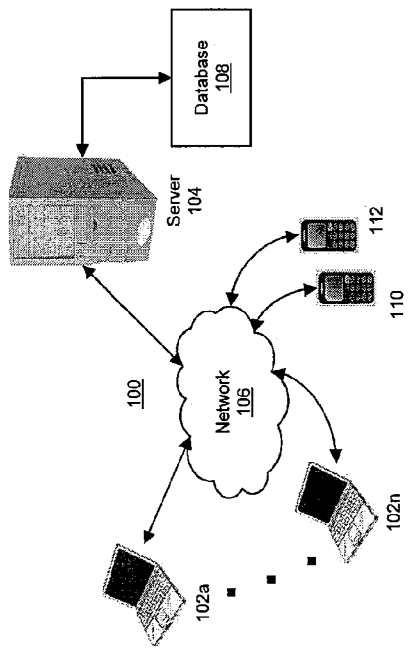
FIG. 1 is a simplified block illustration of a computer network for use in an Exit Express application, or Exit Express Engine, environment in accordance with the present invention.

A description of structural embodiments and methods of the present invention is provided with reference to FIGS. 1-9. It is to be understood that there is no intention to limit the invention to the specifically disclosed embodiments but that the invention may be practiced using other features, elements, methods, and embodiments. Like elements in various embodiments are commonly referred to with like reference numerals.

Before describing aspects of the present invention in detail, it is helpful to first discuss the environment in which embodiments of the invention operate. FIG. 1 includes a simplified illustration of a computer network 100, which is such an environment. Network 100 includes one or more client computer systems 102*a*-102*n*, which may be used to access a server 104 at which an instantiation of a computer-based application, which provides the cloud-based and other features discussed below, may be installed and accessible. Such access may be by way of a computer network or network of networks 106, such as a local and/or wide area network. In some cases, network 106 may be or include the network of networks commonly known as the Internet. In other instances, network 106 may be a local area network (LAN) of an enterprise and/or a virtual LAN, which is instantiated over the Internet or other networks of networks. Server 104 is communicatively coupled to a database 108, which may store records concerning purchase authorizations, content, etc. Client computers 102*a*-102*n* may be any form of computer-based system, including personal computers, laptop computers, net book computers, mobile devices such as tablet computers 110, smartphones 112, and the like. Generally, a client computer 102 may run a Web browser application, through which the application running on server 104 may be accessed, however, as described herein client computers 102 may also run a client application specially configured to interface with the application running on server 104. References to a smartphone below should be read as including tablet computers, portable computers (e.g., laptop computers, net books, etc.), and other forms of mobile, computer-based systems.

Figure 2:
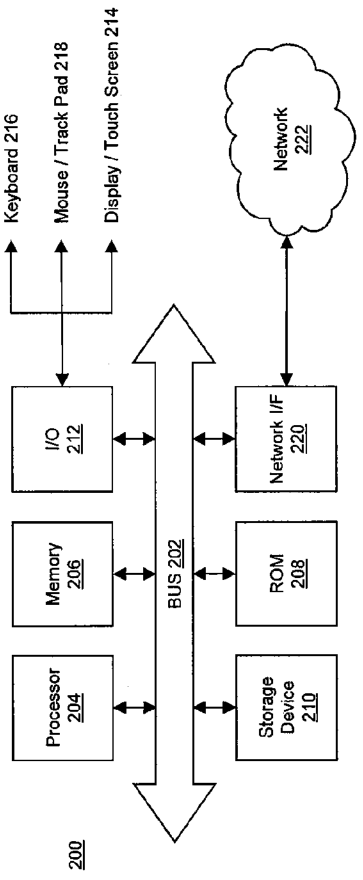
FIG. 2 shows a block diagram illustrating an example of a computer system in accordance with the present invention.

FIG. 2 shows a block diagram illustrating an example of a computer system 200. Any of the client computer systems 102*a*-102*n*, 110, 112, and/or server 104 may be configured in the manner described for computer system 200. Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A computer-readable storage device 210, such as a magnetic disk or optical disk, is provided and coupled to the bus 202 for storing information and instructions.

Computer system 200 may be coupled via the bus 202, either directly or via an input/output module 212, to a display 214, such as a flat panel display, for displaying information to a computer user. An input device 216, including alphanumeric and other keys, is coupled to the bus 202 for communicating information and command selections to the processor 204. Another type of user input device is cursor controller 218, such as a mouse, a trackball, or cursor direction keys for communicating direction information and command selections to processor 204 and for controlling cursor movement on the display 214. In some cases, for example with tablet-style computers, input may be by way of a touch screen display 214 rather than a keyboard/mouse combination.

As should be apparent, aspects of the present invention involve computer software running on clients 102, 110, 112, and server 104. That software may take the form of computer-executable instructions stored in main memory 206 and/or storage device 210, to be executed by processor 204. In other instances, the instructions may be stored on other computer-readable media, such as a floppy disk, a flexible disk, a hard disk, magnetic tape, or any other magnetic medium, a CD-ROM or DVD-ROM, flash memory, or any other physical medium adapted to store computer-readable instruction and from which a computer processor can be read. Execution of the sequences of instructions contained in the main memory 206 causes the processor 204 to perform the processes described herein to provide the miDayBook application and/or the virtual stores and feeds used by the application. In alternative embodiments, hard-wired circuitry may be used in place of or in combination with computer software instructions to implement the invention. Thus, embodiments of the invention are not limited to any specific combination of hardware circuitry and software.

Computer system 200 also includes a network interface 220 coupled to the bus 202. Network interface 220 provides a two-way data communication path for computer system 200 to/from a network 222. For example, network interface 220 may be an integrated services digital network (ISDN) card or a modem to provide a data communication connection to a corresponding type of telephone line. As another example, communication interface 220 may be a LAN card to provide a data communication connection to a compatible LAN. Wireless communication links may also be implemented. In any such implementation, network interface 220 sends and receives electrical, electromagnetic, or optical signals, which carry digital data streams representing various types of information. In one embodiment, network 222 may be network 106, or may be communicatively coupled thereto.

Figure 3:
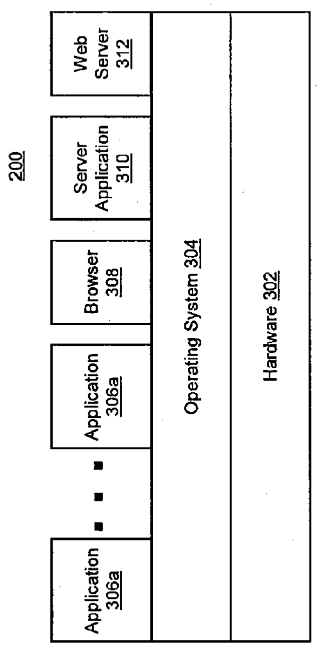
FIG. 3 shows an architecture view of a computer system in accordance with the present invention.

FIG. 3 shows an architecture view of computer system 200. The various hardware components of computer system 200 are represented as a hardware layer 302. An operating system 304 abstracts the hardware layer and acts as a host for various applications (such as the Exit Express applications discussed below) 306*a*-306*m*, that run on computer system 200. In the case of a client computer system, the operating system may also act as a host for a Web browser application 308, while in the case of the server 104, the operating system acts as a host for a server application 310. For the server 104, the operating system may also host a web server application 312, which provides access from the client computers. In other instances, the Web server may be hosted on a separate platform (not shown in detail), which is communicatively coupled to a server hosting application 310.

The remaining FIGS. 4-7 illustrate various features and functions of the Exit Express application (also referred to Exit Express Engine) and its use when installed on a client computer system, such as a smartphone or the like. Descriptions of the features and functions set forth in the drawings are incorporated herein by reference.

Figure 4:
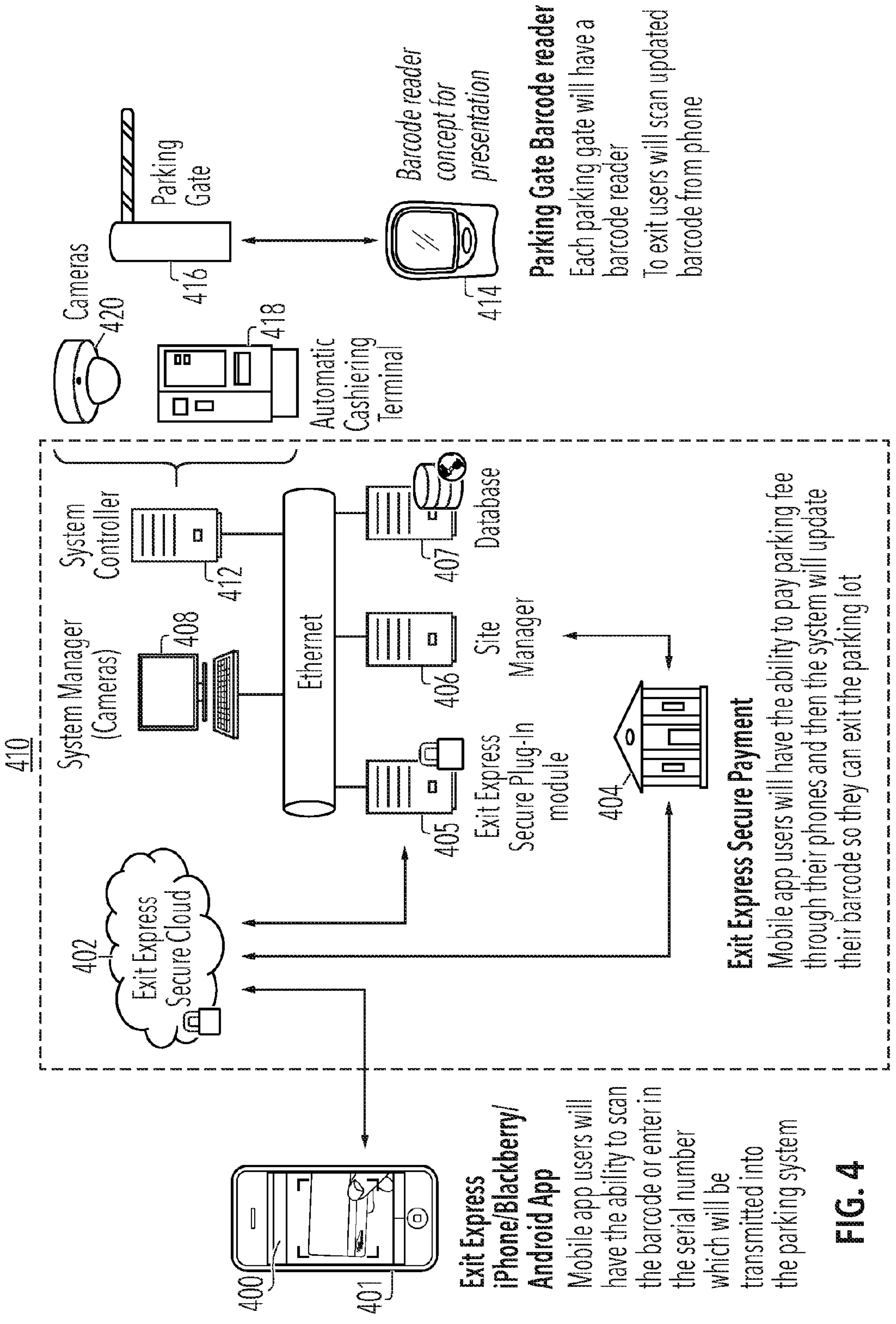
FIG. 4 illustrates one embodiment of an Exit Express application, or Exit Express Engine, embodied on a smartphone in accordance with the present invention.

Referring first to FIG. 4, an Exit Express application (or an Exit Express Engine) 400 installed on a smartphone 401 or similar device is launched and used to scan (e.g., using a camera or other imaging system incorporated with the smartphone) a barcode or other identification means printed on a parking garage ticket or other device, which was provided to the user at the time of entry into the parking garage or other subject facility. In some instances, this device may be an airline ticket, or other multipurpose device. In other instances, this device may be a specially issued ticket or other means that is provided to and associated with the user at the time the user enters the controlled-exit facility. For example, it could be a visitor's pass issued to the user upon entry into a controlled-exit facility. The barcode or other identification means could be a numeric-only barcode, an alpha-numeric barcode, a linear barcode, a two-dimensional barcode, or other identification means. The type of encoding used in connection with the barcode or other identification means is not critical to the present invention and could be any of an Aztec code, a codabar, a code 11 barcode, a code 128 barcode, a code 39 barcode, an extended code 39 barcode, a code 93 barcode, a composite code, a data matrix, an EAN-13 barcode, an EAN-8 barcode, an EAN Bookland barcode, an Industrial 2 of 5 barcode, an Interleaved 2 of 5 barcode, an ITF-14 barcode, a LOGMARS barcode, a maxicode, an MSI barcode, an MSI Plessey barcode, an optical industry Association (OPC) barcode, a PDF-417 barcode, a postnet barcode, a QR code, an SCC-14 barcode, a Standard 2 of 5 barcode, a UCC/EAN-128 barcode, a UCC/EAN Shipping Container Code, a UPC Shipping Container Code, a UPC-A barcode, a UPC-E barcode, or another form of code. As is evident from this list, the identification means may be associated with a tangible item rather than an individual, or in some instances with both an item and an individual.

Mobile application users have the ability to scan the barcode or enter in the serial number, which is then transmitted into the parking system via a Cloud Payment System 410. There are several different methods of sending payments, such as sending payment instructions using the cloud technology in order to house the data in a secure environment for payment processing. In one embodiment of the present invention, a Cloud Payment System 410 includes the Exit Express Secure Cloud 402, Exit Express Secure Payment 404, Express Exit Secure Plug-In Module 405, Site Manager 406, Database 407, System Manager 408, and a System Controller 412. Information scanned by the smartphone or mobile device may be transmitted (securely or in the clear) to an associated parking system, where it is received by an Exit Express Plug-in Module 405 or other application executing on a server. Payment information may be provided via the smartphone to an associated payment processing facility, which in turn informs the parking system when payment has been effected. In the case of goods, the payment may be for cash-on-delivery (COD) items, or to confirm customs or similar restrictions clearance that are required prior to the goods leaving the controlled-exit facility.

After payment has been processed through the Exit Express Cloud Payment System 410, a confirmation barcode is sent to the user's mobile device or smartphone. Once the user drives to his/her vehicle, the user may scan the barcode in the Parking Garage Barcode Reader 414. Once the barcode is verified, the Parking Garage Barcode 414 initiates the Parking Gate 416 to open, allowing the user to egress. The System Controller 412 is intended to replace the method of the traditional approach of using an Automatic Cashier Terminal 418 and Cameras 420. In the present invention, the System Controller 412 takes place for the traditional methods. In the case of the parking facility, the payment information is married with the identification information provided by the smartphone and a record stored to indicate that when the parking garage ticket is presented at the exit, the exit should be permitted. In some instances, the window of time for such an exit may be set to specified boundaries to prevent pre-payment too far in advance of the actual time of exit. The parking garage ticket may be presented for review at the controlled-exit Parking Gate 416 itself, where a similar scan of the barcode (this time by the parking facility systems) can be effected. The information obtained by this scan at the parking facility (or some index computed therewith) may be used as a means to access the stored database record that indicates proper payment has been effected, whereupon a control signal to permit the exit of the vehicle may be generated and passed to a controller which operates a parking garage gate or similar exit control means.

Figure 5:
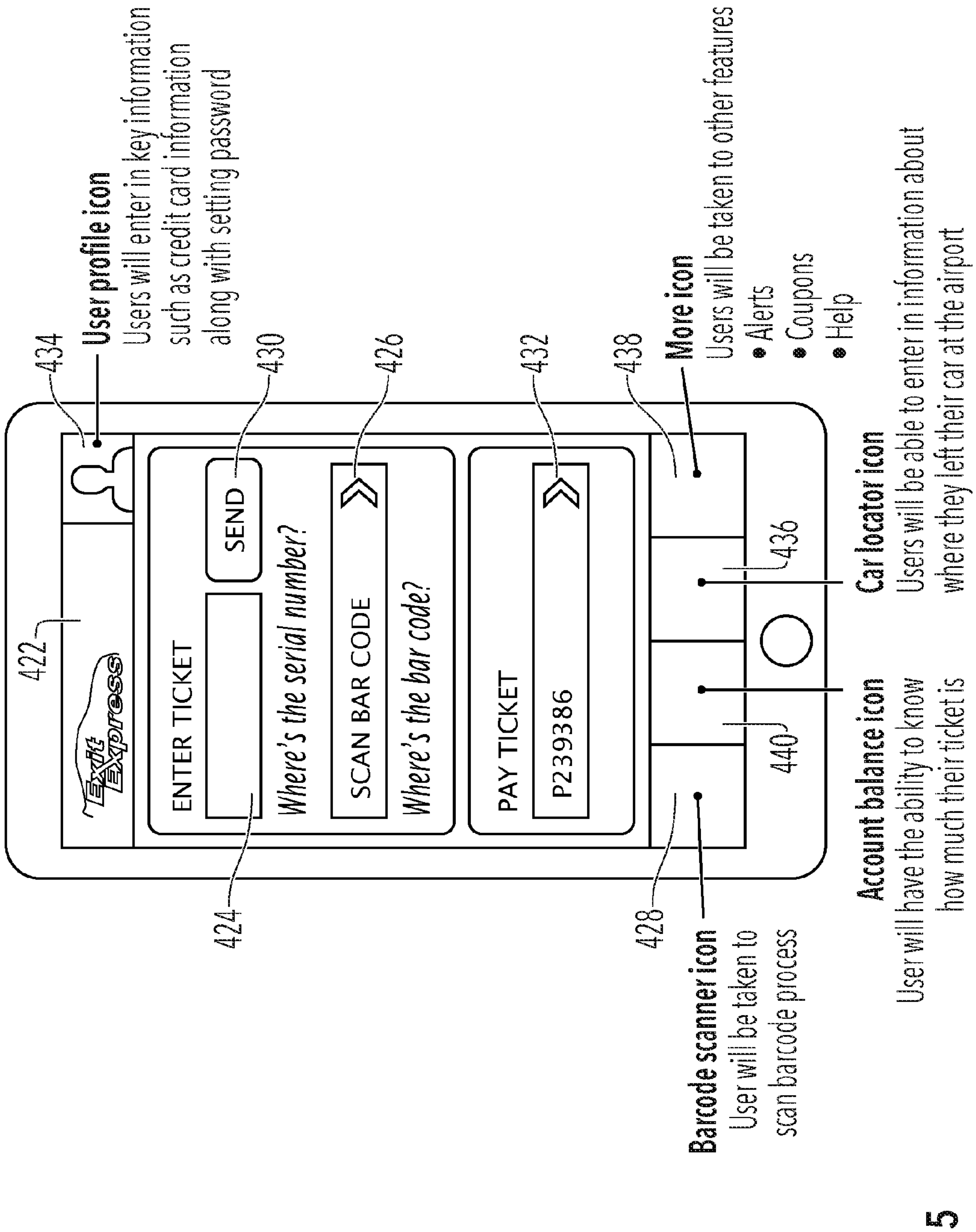
FIG. 5 shows an example of a user interface screen for the Exit Express application, or Exit Express Engine, as instantiated on a smartphone in accordance with the present invention.

Referring now to FIG. 5, an example of a user interface screen 422 for the Exit Express application or Exit Express Engine 400 as instantiated on a smartphone or similar device is shown. The user interface includes at least one text box 424 or other fields for a user to enter a ticket number (e.g., if the smartphone or other device is not equipped with a camera or other means to scan the barcode printed on the ticket or in instances where the ticket does not include a barcode or in some cases where a user has a multiple use pass and so is able to reuse a serial number or similar identifier for multiple entries/exits). In addition, the user interface includes a button (labeled "SCAN BAR CODE" 426) and/or other user input means 428 (see the tool bar at the bottom of the user interface) to begin the scanning process. The scanning process, once initiated, would have the smartphone's camera activated so that the user can capture an image of the barcode on the ticket.

Once the barcode or serial number information is available, it can be transmitted from the smartphone to the parking (or other control) system. This may be done in response to the user pressing a "SEND" button 430 or other user interface object that initiates the data transfer. The user is also provided means to initiate payment for the ticket (e.g., "PAY TICKET" button 432). Activating this button or other user interface object imitates a process whereby the smartphone sends payment instructions and, optionally payment information, to a payment processing facility associated with the parking system. In some cases, the payment information may be stored on the smartphone, e.g., as part of a user profile 434. In other cases, the payment information may be stored by the payment processing system, and the instructions to pay the ticket operate as an authorization to use the information on file to effect payment. Payment information may be any of a credit card number, a bank account number and routing information, a Web-based payment facility (e.g., PayPal™ or the like), or other payment means.

The user interface may also include means (e.g., icons, buttons or other user interface objects), which allow a user to launch a car location 436 portion of the application. Here, the user may store information regarding the location of his/her vehicle in the parking garage. The information may be entered manually or may be entered automatically using the smartphone's location services facilities (e.g., GPS and/or cellular telephone location facilities). Other icon buttons 438 may be provided to launch features such as alerts (e.g., concerning the parking garage), coupons (explained below), help, etc.

One such user interface object may be used to check an account balance 440 where the user has a pre-established credit account with the parking facility. Use of such an account avoids the need for the user to store separate payment information with the parking system or on the smartphone.

Figure 6:
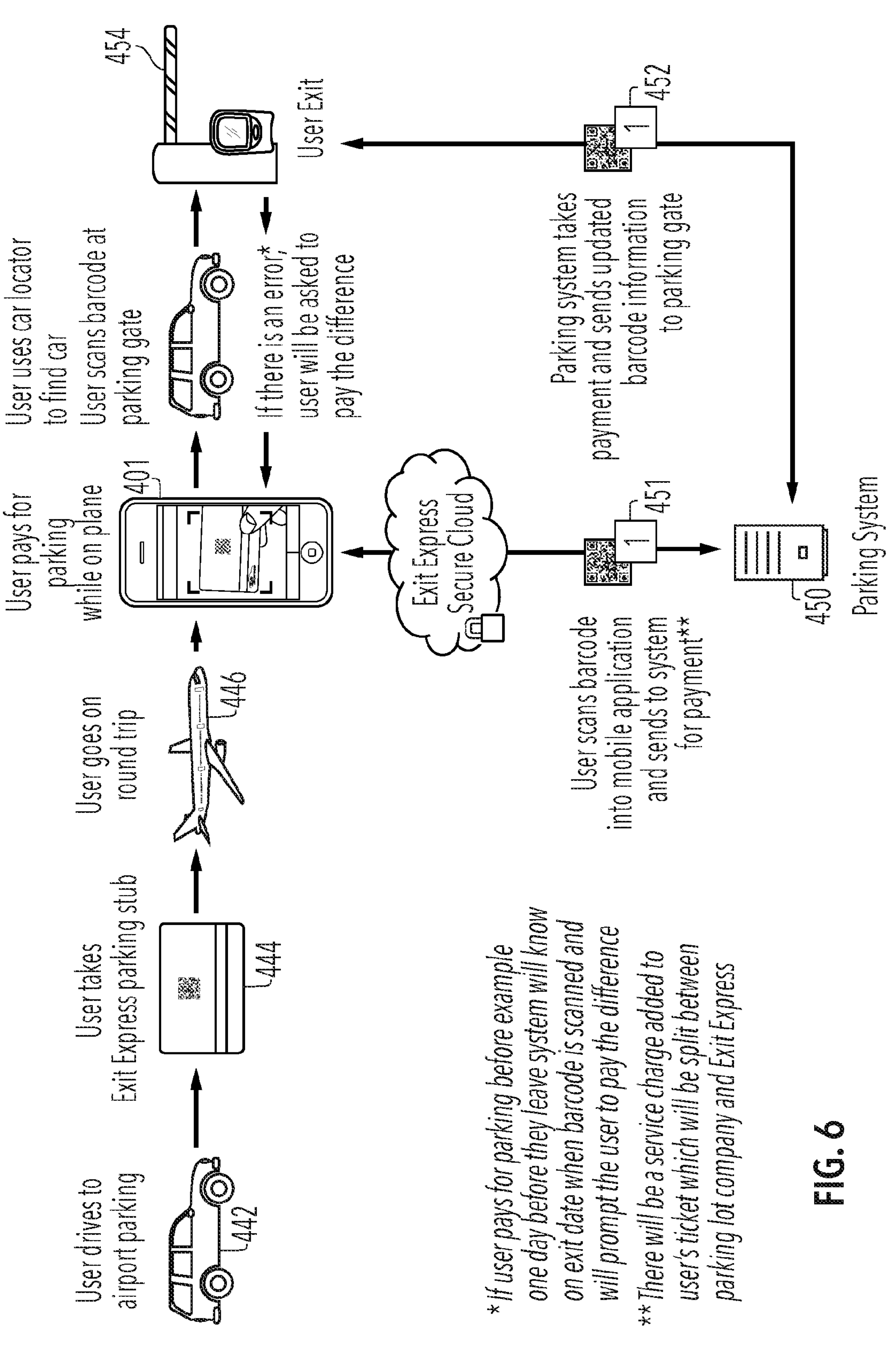
FIG. 6 illustrates an example of the use of the Exit Express system for entering and exiting a parking facility in accordance with the present invention.

FIG. 6 illustrates an example of the use of the Exit Express system. From left to right, the user first enters a parking garage or other facility configured to use the Exit Express system. In this example, the user is driving a vehicle 442, but as indicated above, many other use scenarios are contemplated. Upon entry into the parking facility, the user receives an exit ticket 444 or other exit identification means, which may in some cases be printed with a barcode. In other instances, the exit identification means will have an associated serial number or other identifier.

The user then travels away 446 from the parking garage and upon return, usually before retrieving his/her vehicle, activates the Exit Express application, or Exit Express Engine, 400 on his/her smartphone. The user uses the Exit Express application, or Exit Express Engine, 400 to scan the barcode or other identifier from the ticket into the smartphone 401 (or enters the information manually) and indicates that payment should be effected 451 (either using payment information sent to the payment processing station or by authorizing a charge to a pre-established account). The user then proceeds to his/her vehicle while the parking system 450 verifies payment and stores the verification 452, awaiting scanning of the exit ticket at the controlled-exit point 454. When the user arrives at the controlled-exit 454 point he/she presents the ticket. The bar code on the ticket is scanned, the parking system confirms payment and then sends the exit authorization signal to the controlled-exit point. In response, the parking exit gate or other control means is activated to allow the user and the vehicle to exit.

In alternative embodiments, the parking system may transmit an exit authorization code (e.g., in the form of a barcode or other identifier) to the smartphone once payment has been verified and that exit authorization code may be used to facilitate exit at the controlled-exit point. This may involve the user presenting the display of the smartphone for an exit authorization bar code to be scanned by the parking system. When the code is verified, the system may activate the exit gate, allowing the user to egress. In either of the above instances, payment receipts may be provided to the user (e.g., by e-mail or by being made available for download from a secure Web site, etc.).

If the user does not exit by a time deadline associated with the payment obtained by the parking system, he/she may be refused exit and may be required to pay the difference before exit is authorized. Such payment may be effected through the same pre-established account used to pay the original parking charges, so as not to unnecessarily inconvenience the user or others waiting to exit the parking facility.

Figure 7:
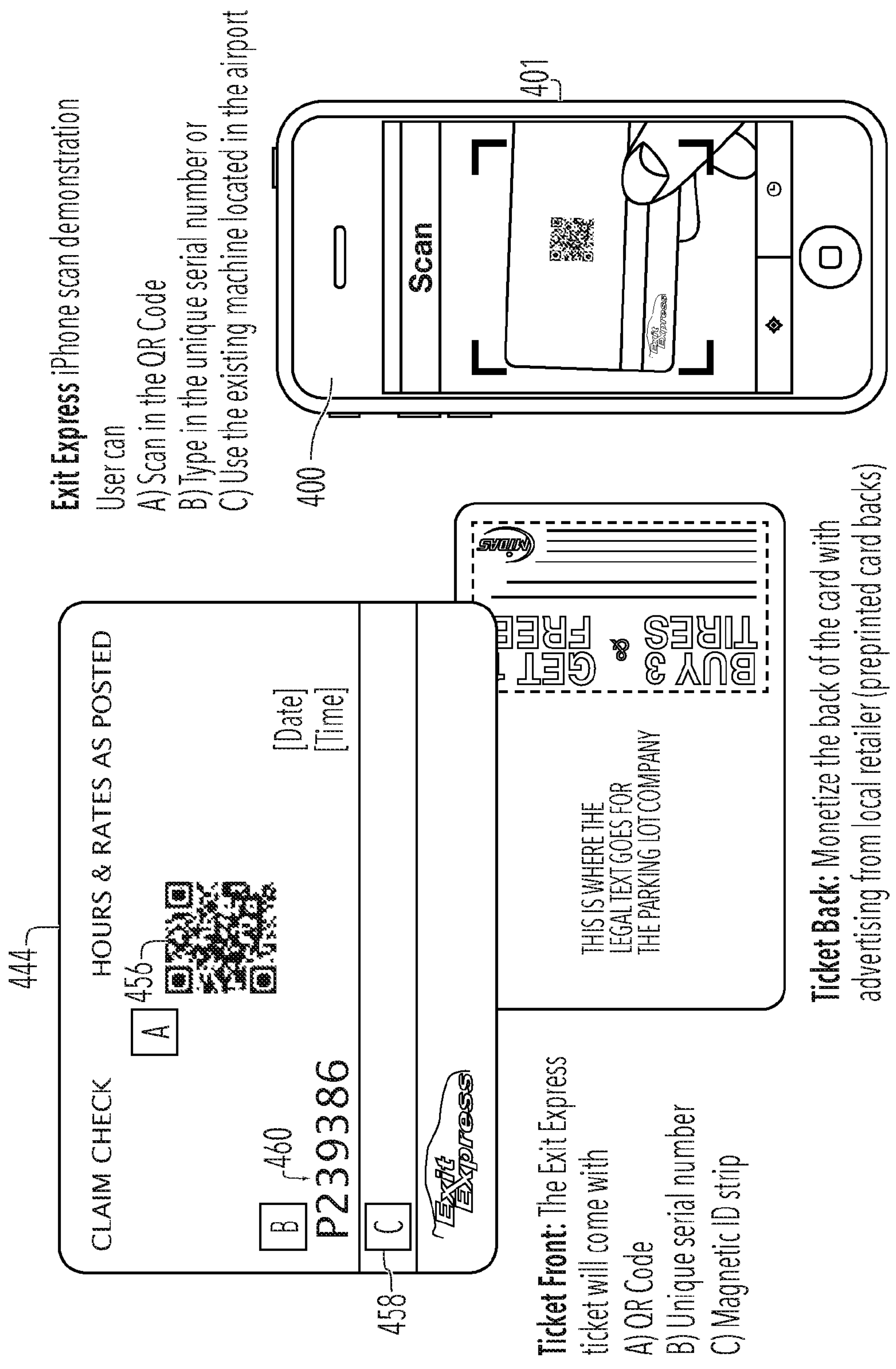
FIG. 7 illustrates an example of a parking ticket encoded with a barcode and an example of how the barcode is scanned using a camera associated with a smartphone in accordance with the present invention.

FIG. 7 illustrates an example of a parking ticket 444 encoded with a barcode 456 and an example of how the bar code is scanned using a camera associated with a smartphone. The ticket may include advertising on a reverse side, or such advertisements may be provided to the user's smartphone via the Exit Express application, or Exit Express Engine. The ticket may also include a traditional magnetic stripe 458 and/or a serial number 460. The serial number may be used in the fashion described above if the user is unable to scan the barcode. The magnetic strip may be used by legacy parking systems that cannot scan barcodes at points of exit. The magnetic stripe may be encoded with information sufficient to allow the parking system to associate the exit authorization stored when the user effects payment of the parking charges.

Thus, methods and systems for facilitating exit from a parking lot, parking garage, or similar venue for which payment or other compensation, or identification, must be provided prior to being permitted egress have been shown and described.

Figure 8:
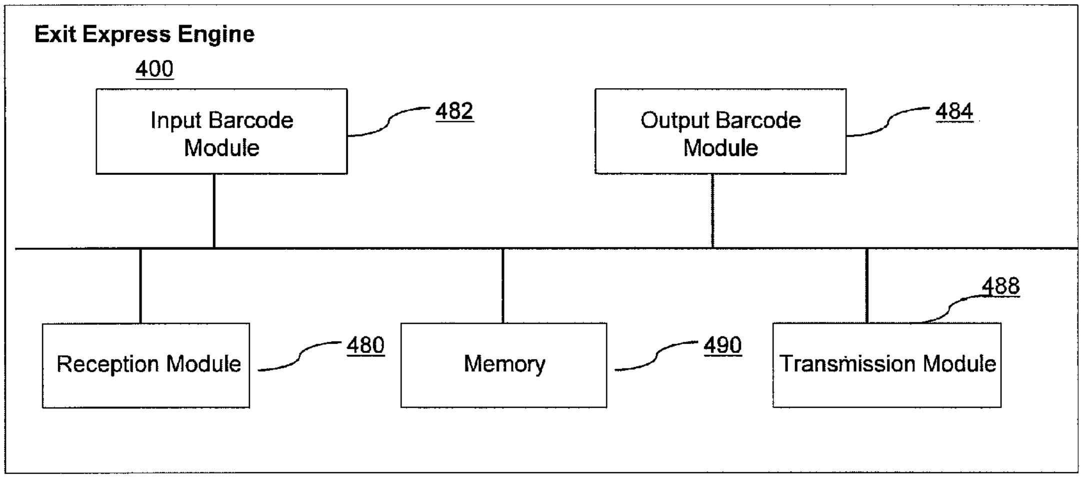
FIG. 8 is a software system diagram illustrating the Exit Express application, or Exit Express Engine, in accordance with the present invention.

FIG. 8 is a software system diagram illustrating the Exit Express Engine 400 that includes an Input Barcode Module 482, an Output Barcode Module 484, a Reception Module 480, a Transmission Module 488, and Memory 490. The Input Barcode Module 482 is configured to receive a first barcode from a machine to a smartphone phone through the Reception Module 480. The output barcode module 484 is configured to send a second barcode from the smartphone to the machine through the Transmission Module 488. Any intermediate files, or prior digital files, can be stored in the Memory 490 for subsequent accessing and processing.

Figure 9:
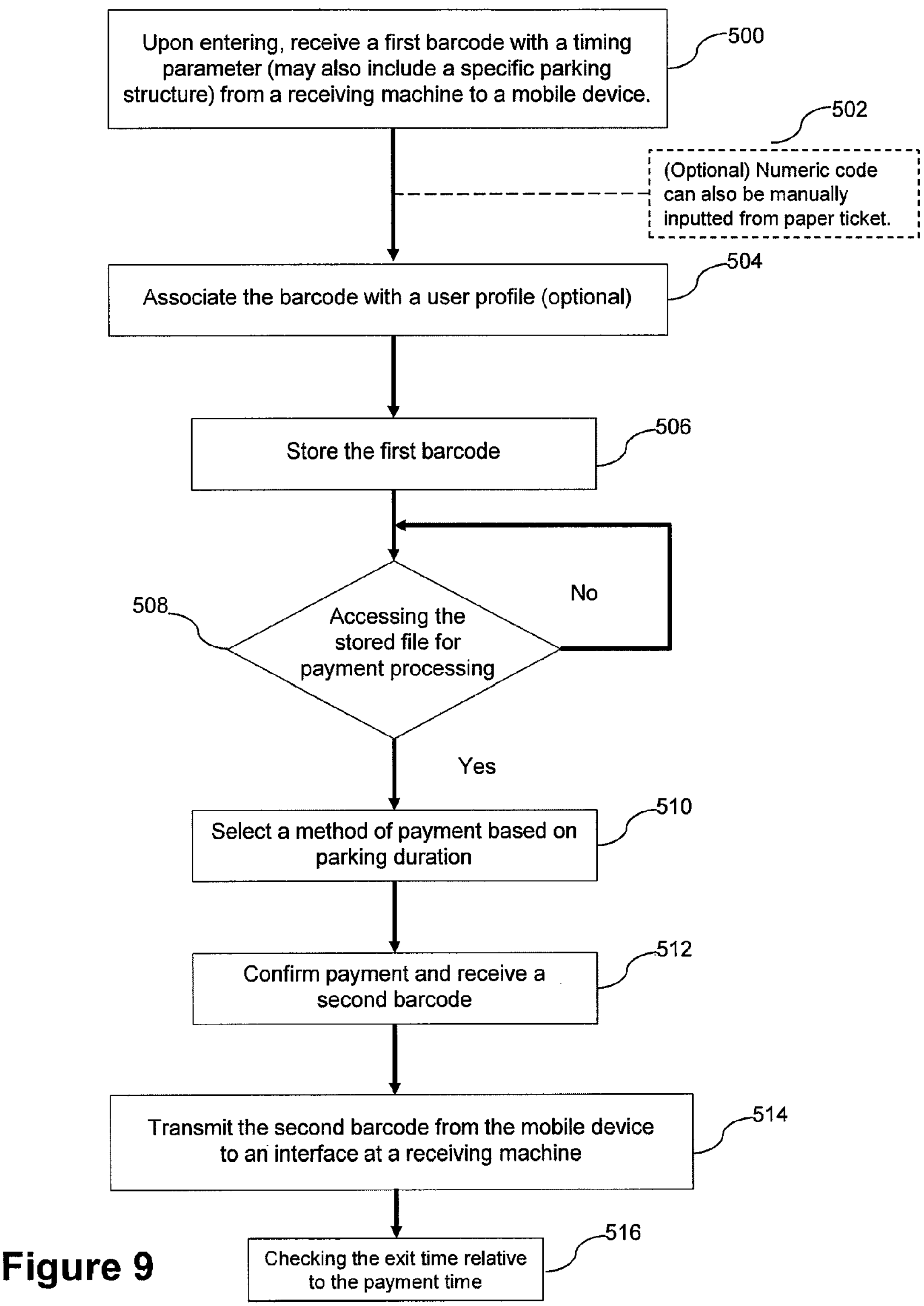
FIG. 9 is a flow diagram illustrating one embodiment of the Exit Express application, or Exit Express Engine, in accordance with the present invention.

FIG. 9 is a flow diagram illustrating one embodiment of the Exit Express application (also referred to the Exit Express Engine) in accordance with the present invention. FIG. 9 displays a flow diagram, which describes the general process and supports the method claims of the present invention. Particularly, the flow chart emphasizes the core process of the invention, which allows a user to park more effectively and acquire rapid confirmation of payment through the use of the Exit Express Engine software.

Upon entering a parking structure or other controlled-exit facility, the user accesses the Exit Express Engine 400, which is configured to receive a first barcode 500 with a timing parameter from a receiving machine to a mobile device, such as a smartphone, tablet, etc. An optional embodiment of the present invention allows the user to enter the first barcode (or other numeric code) manually 502 from the paper ticket into the mobile device. At the point of entry, the user receives a parking ticket with the first barcode, which he/she scans and stores 506 into the mobile device. This first parking ticket marks the time of entry, which allows the Exit Express Engine 400 to calculate the duration when the user arrives, and eventually, when the user leaves the parking structure or facility.

In another optional embodiment of the present invention, the user may associate the barcode with his/her user profile 504 in the Exit Express Engine. The Exit Express Engine 400 allows the user to store information, which is part of his/her registration in the user's profile, such information includes, but is not limited to, personal information, credit card information or other methods of payment, among other. In additional to storing the registration information, the user profile serves as a functional process by permitting the user to store parking location information, such as a designated parking lot number and/or parking spot number. Through the Exit Express Engine 400, the user can record/store pertinent information relating to the parking services being used. In this respect, the Exit Express Engine 400 stores the information in the user profiles and may form a general database of information that can be shared amongst businesses in different sectors or industries. For example, with the contact information of users, other businesses (such as Hotels, Airports, etc.) may connect with users in order to market their respective services through mobile devices or smartphones.

Upon return of his/her trip, the user accesses, through the Exit Express Engine 400, the stored file 508 in the Exit Express application for payment processing. In this step, the user returns to the parking structure, opens the application, and the application calculates the parking duration and estimated parking charges. This process gives the user the ability to pay via different payment methods 510, including PayPal, Credit Card, among others. Once the user reviews the parking information and selects a method of payment, he/she continues to confirm payment 512 and receives a second barcode. The second barcode is an approval/confirmation of the received payment. The user receives such confirmation on his/her smartphone, tablet, or other mobile device.

After receiving payment confirmation, the user proceeds to vehicle and accesses the controlled-exit gate. The second barcode that is received in the Exit Express Engine 400 is then transmitted from the smartphone, tablet, or mobile device to an interface 514 at a receiving machine in the designated point of exit. Essentially, a sensor transmits the second barcode at the point of exit from the mobile device into a receiving machine, checking the exit time relative to the payment time 516 and allowing the controlled-exit point to open within a timing parameter.

Embodiments of the present invention may be implemented with the aid of computer-implemented processes or methods (a.k.a. programs or routines) that may be rendered in any computer language. Further, some portions of the description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of an appropriately programmed computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention can be implemented with an apparatus to perform the operations described herein. This apparatus may be specially constructed for the required purposes, or it may comprise a computer system that is selectively activated or reconfigured by a computer program, which it executes and which is stored on one or more computer-readable storage mediums accessible to processing elements of the computer system. For example, such a computer program may be stored in a computer readable storage medium, such as, but not limited to, any type of disk including floppy disks, optical disks, compact disk read only memories (CD-ROMs), and magnetic-optical disks, read-only memories (ROMs), flash drives, random access memories (RAMs), erasable programmable read only memories (EPROMs), electrically erasable programmable read only memories (EEPROMs), flash memories, other forms of magnetic or optical storage media, or any type of media suitable for storing electronic instructions, and each accessible to a computer processor, e.g., by way of a system bus or other communication means.

The algorithms and processes presented herein are not inherently related to any particular computer system, processor, or other apparatus. Various electronic computing apparatus, along with, where necessary, suitable computer programs that instantiate processes in accordance with the teachings herein, may be used. For example, any of the present methods can be implemented in hard-wired circuitry, by appropriate programming of a computer processor or processors, or any combination of hardware and software may be used to carry out the methods discussed below. Of course, the invention can be practiced with computer system configurations other than those particularly described below, including systems that comprise hand-held devices, multiprocessor systems, microprocessor-based electronic devices, digital signal processor-based devices, networked computer systems, personal computers, and the like, and it should be recognized that these examples presented herein are used merely for purposes of illustration. The invention can also be practiced in distributed computing environments where tasks are performed by computer processing devices that are remote to one another, either physically and/or logically, and are linked through one or more communications networks. The required structure for a variety of these systems will appear from the description below.

Some portions of the above description describe the embodiments in terms of algorithmic descriptions and processes, e.g., as with the description within the figures. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor. Furthermore, it has also proven convenient at times, to refer to these arrangements of operations as modules, without loss of generality. The described operations and their associated modules may be embodied in software, firmware, hardware, or any combinations thereof.

The present invention has been described in particular detail with respect to possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. The system may be implemented via a combination of hardware and software, as described, or entirely in hardware elements, or entirely in software elements. The particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

As used herein, any reference to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is generally conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

In various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: mobile phones, personal digital assistants, smartphones, kiosks, desktop computers, laptop computers, tablet computers, browser-based computers, consumer electronic devices, automobiles, televisions, set-top boxes, watches or the like. An electronic device for implementing the present invention may use an operating system such as, for example, iOS available from Apple Inc. of Cupertino, Calif., Android available from Google Inc. of Mountain View, Calif., Microsoft Phone 7 available from Microsoft Corporation of Redmond, Wash., webOS available from Palm, Inc. of Sunnyvale, Calif., or, or any other operating system that is adapted for use on the device. In some embodiments, the electronic device for implementing the present invention includes functionality for communication over one or more networks, including for example a cellular telephone network, wireless network, and/or computer network such as the Internet.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

It should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

An ordinary artisan should require no additional explanation in developing the methods and systems described herein but may nevertheless find some possibly helpful guidance in the preparation of these methods and systems by examining standard reference works in the relevant art.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. The terms used should not be construed to limit the invention to the specific embodiments disclosed in the specification and the claims, but should be construed to include all methods and systems that operate under the claims set forth herein below. Accordingly, the invention is not limited by the disclosure, but instead its scope is to be determined entirely by the following claims.

What is claimed and desired to be secured by Letters Patent of the United States is:

1. A computer-implemented method for entering and exiting a parking facility, comprising:

receiving a first barcode with a timing parameter at a mobile device, the timing parameter indicating an entry time into a control-exit parking facility, and the first barcode being generated by a machine at a point of entry to the control-exit parking facility;

storing a file having the first barcode on a storage medium;

upon a request from the mobile device, accessing the file for payment processing by calculating a value as determined by a difference between the entry time and an exit time;

generating a second barcode upon successful payment processing and sending the second barcode to the mobile device;

transmitting the second barcode from the mobile device to a machine at a point of exit from the control-exit parking facility prior to exiting the control-exit parking facility; and upon receipt of the second bar code from the mobile device at the machine at the point of exit from the control-exit parking facility, determining if a vehicle associated with a user of the mobile device can exit the control-exit parking facility.

2. The method of claim 1, wherein the first barcode comprises a numeric-only barcode, an alpha-numeric barcode, a linear barcode, or a two-dimensional barcode.

3. The method of claim 1, wherein the the first bar code comprises a barcode selected from the group consisting of an Aztec code, a codabar, a code 11 barcode, a code 128 barcode, a code 39 barcode, an extended code 39 barcode, a code 93 barcode, a composite code, a data matrix, an EAN-13 barcode, an EAN-8 barcode, an EAN Bookland barcode, an Industrial 2 of 5 barcode, an Interleaved 2 of 5 barcode, an ITF-14 barcode, a LOGMARS barcode, a maxi code, an MSI barcode, an MSI Plessey barcode, an optical industry Association (OPC) barcode, a PDF-417 barcode, a postnet barcode, a QR code, an SCC-14 barcode, a Standard 2 of 5 barcode, a UCCIEAN-128 barcode, a UCCIEAN Shipping Container Code, a UPC Shipping Container, Code, a UPC-A barcode, and a UPC-E barcode.

4. The method of claim 1, wherein the first barcode is associated with a specially issued ticket.

5. The method of claim 1, wherein the first barcode is associated with a tangible item.

6. The method of claim 1, wherein the first barcode is associated with a tangible item and a user.

7. The method of claim 1, wherein the difference between the entry time and the exit time is calculated to have a window which permits sufficient time for exiting the control-exit facility from a time of payment.

8. The method of claim 1, further comprising associating the first barcode with a user profile.

9. The method of claim 8, wherein the user profile includes preferred payment information of the user, the preferred payment information including a credit card number, a bank account and routing information, or a web-based payment facility.

10. The method of claim 9, wherein the user profile includes a location in which the vehicle is parked in the control-exit parking facility.

11. The method of claim 10, wherein the location of the vehicle is provided by a location-based services facilities.

12. The method of claim 1, wherein after the successful payment processing, the vehicle is to exit the control-exit parking facility within a pre-established time period, the method further comprising:

authorizing the exit if the vehicle exits within a pre-established time period; and refusing the exit if the vehicle does not exit within the within a pre-established time period, and requiring the user to pay for a difference in the exit time before the exit is authorized.

13. The method of claim 12, wherein the user makes the payment via the mobile device.

14. The method of claim 12, wherein the payment is made using the file used to process original parking charges.

15. A computer-implemented method for entering and exiting a facility, comprising:

receiving an identification information with a timing parameter at a mobile device, the timing parameter indicating an entry time into a control-exit parking facility, the identification information including a first barcode that is generated by a machine at a point of entry to the control-exit parking facility;

storing the identification information on a storage medium;

upon a request from the mobile device, accessing the identification information for payment processing by calculating a value as determined by a difference between the entry time and an exit time;

generating a second barcode upon successful payment processing and sending the second barcode to the mobile device;

transmitting the second barcode from the mobile device to a machine at a point of exit from the control-exit parking facility prior to exiting the control-exit parking facility; and upon receipt of the second bar code from the mobile device at the machine at the point of exit from the control-exit parking facility, determining if a vehicle associated with a user of the mobile device can exit the control-exit parking facility.

16. The method of claim 15, wherein the first barcode comprises a numeric-only barcode, an alpha-numeric barcode, a linear barcode, or a two-dimensional barcode.

17. The method of claim 15, wherein the first barcode comprises a barcode selected from the group consisting of an Aztec code, a codabar, a code 11 barcode, a code 128 barcode, a code 39 barcode, an extended code 39 barcode, a code 93 barcode, a composite code, a data matrix, an EAN-13 barcode, an EAN-8 barcode, an EAN Bookland barcode, an Industrial 2 of 5 barcode, an Interleaved 2 of 5 barcode, an ITF-14 barcode, a LOGMARS barcode, a maxi code, an MSI barcode, an MSI Plessey barcode, an optical industry Association (OPC) barcode, a PDF-417 barcode, a postnet barcode, a QR code, an SCC-14 barcode, a Standard 2 of 5 barcode, a UCCIEAN-128 barcode, a UCCIEAN Shipping Container Code, a UPC Shipping Container, Code, a UPC-A barcode, and a UPC-E barcode.

18. The method of claim 15, wherein the difference between the entry time and the exit time is calculated to have a window which permits sufficient time for exiting the control-exit facility from a time of payment.

19. The method of claim 15, further comprising associating the first barcode with a user profile.

20. The method of claim 19, wherein the user profile includes preferred payment information of the user, the preferred payment information including a credit card number, a bank account and routing information, or a web-based payment facility.

21. The method of claim 19, wherein the user profile includes a location in which a vehicle is parked in the control-exit parking facility.

22. A computer program product comprising a non-transitory computer readable storage medium structured to store instructions executable by a processor in a mobile device, the instructions, when executed, causing the processor to:

receive a first barcode with a timing parameter at a mobile device, the timing parameter indicating an entry time into a control-exit parking facility, and the first barcode being generated by a machine at a point of entry to the control-exit parking facility;

store a file having the first barcode on a storage medium;

upon a request from the mobile device, access the file for payment processing by calculating a value as determined by a difference between the entry time and an exit time;

generate a second barcode upon successful payment processing and send the second barcode to the mobile device;

transmit the second barcode from the mobile device to a machine at a point of exit from the control-exit parking facility prior to exiting the control-exit parking facility; and upon receipt of the second bar code from the mobile device at the machine at the point of exit from the control-exit parking facility, determine if a vehicle associated with a user of the mobile device can exit the control-exit parking facility.

* * * * *